US00RE42919E

(19) United States
(12) Reissued Patent
Hosur et al.

(10) Patent Number: US RE42,919 E
(45) Date of Reissued Patent: Nov. 15, 2011

(54) POWER CONTROL WITH SPACE TIME TRANSMIT DIVERSITY

(75) Inventors: Srinath Hosur, Plano, TX (US); Anand G. Dabak, Plano, TX (US)

(73) Assignee: Texas Instruments Incorporated, Dallas, TX (US)

(21) Appl. No.: 11/454,181

(22) Filed: Jun. 16, 2006

Related U.S. Patent Documents

Reissue of:
(64) Patent No.: 6,977,910
Issued: Dec. 20, 2005
Appl. No.: 09/224,401
Filed: Dec. 31, 1998

(51) Int. Cl.
*H04B 7/185* (2006.01)
*H04B 1/00* (2006.01)
*H04B 7/216* (2006.01)
*H03C 7/02* (2006.01)
*H04J 3/00* (2006.01)

(52) U.S. Cl. ..... 370/318; 455/13.4; 455/69; 455/101; 370/320; 370/335; 370/341

(58) Field of Classification Search ..... 370/318, 370/320, 335, 342, 441, 319, 329, 332, 333, 370/431, 464; 455/69, 101, 13.4, 92, 115.1, 455/24, 39, 68, 134, 135; 375/142, 144, 375/148, 267
See application file for complete search history.

(56) References Cited

U.S. PATENT DOCUMENTS 5,056,109 A * 10/1991 Gilhousen et al. ..... 370/342
5,506,861 A * 4/1996 Bottomley ..... 370/441
5,603,096 A * 2/1997 Gilhousen et al. ..... 370/468
5,832,044 A * 11/1998 Sousa et al. ..... 375/347
5,839,056 A * 11/1998 Hakkinen ..... 370/342
5,859,875 A * 1/1999 Kato et al. ..... 375/267
5,859,879 A * 1/1999 Bolgiano et al. ..... 375/347
5,886,987 A * 3/1999 Yoshida et al. ..... 370/318
5,970,061 A * 10/1999 Kokudo ..... 370/344
5,982,760 A * 11/1999 Chen ..... 370/335
6,029,056 A * 2/2000 Kiyanagi et al. ..... 455/137
6,069,912 A * 5/2000 Sawahashi et al. ..... 375/347
6,070,086 A * 5/2000 Dobrica ..... 455/522
6,115,591 A * 9/2000 Hwang ..... 455/135
6,131,016 A * 10/2000 Greenstein et al. ..... 455/69
6,185,258 B1 2/2001 Alamouti et al.

(Continued)

OTHER PUBLICATIONS

"*Complexity Requirements of OTD and TSTD*", *ETSI SMG2 UMTS, Physical Layer Expert Group,* Meeting No. 6, Helsinski, Finland, Sep. 8-11, 1998, pp. 1-12.

(Continued)

*Primary Examiner* — Hanh Nguyen
(74) *Attorney, Agent, or Firm* — Ronald O. Neerings; Wade James Brady, III; Frederick J. Telecky, Jr.

(57) ABSTRACT

A circuit is designed with a measurement circuit (432). The measurement circuit is coupled to receive a first input signal (903) from a first antenna (128) of a transmitter and coupled to receive a second input signal (913) from a second antenna (130) of the transmitter. Each of the first and second signals is transmitted at a first time. The measurement circuit produces an output signal corresponding to a magnitude of the first and second signals. A control circuit (430) is coupled to receive the output signal and a reference signal. The control circuit is arranged to produce a control signal at a second time in response to a comparison of the output signal and the reference signal.

38 Claims, 6 Drawing Sheets

U.S. PATENT DOCUMENTS

| | | | | |
|---|---|---|---|---|
| 6,317,587 | B1 * | 11/2001 | Tiedemann et al. | 455/69 |
| 6,373,832 | B1 * | 4/2002 | Huang et al. | 370/342 |
| 6,463,295 | B1 * | 10/2002 | Yun | 455/522 |
| 6,522,639 | B1 * | 2/2003 | Kitade et al. | 370/342 |
| 6,545,991 | B1 * | 4/2003 | Kitade et al. | 370/335 |
| 6,584,161 | B2 * | 6/2003 | Hottinen et al. | 375/299 |
| 6,775,329 | B2 * | 8/2004 | Alamouti et al. | 375/267 |

OTHER PUBLICATIONS

"*Forward Link Time Domain Transmit Diversity* (*TDTD*)", *IMT-2000 Study Committee, Air-Interface WG, SWG2,* Doc. #AIF/SWG2-26-30, Nokia, Samsung, Aug. 1998, pp. 1-19.

"*Orthogonal TransmitDiversity for CDMA Forward Link", FPLMTS Study Committee, Air-Interface WG, SWG2,* Document No. AIF/SWGI-16-26(P), Mar. 1998, Motorola,Nortel, Qualcomm, Samsung, pp. 1-7.

"*New Detection Schemes For Transmit Deiversity With No Channel Estimation",* Tarokh, et al., *ICUPC* '98 Proceedings, pp. 1-4.

"*Space-Time Codes for High Data Rate Wireless Communication Performace Criterion and Code Construction",* Tarokh, et al., *IEEE Transactions on InformationTheory,* vol. 44, No. 2, Mar. 1998, pp. 744-765.

"*UTRA FDD Downlink Transmission Diversity Concept", ETSI SMG2 UMTS, Physical Layer Expert Group, Tdoc SMG2 315 UMTS-LI /98,* Meeting No. 6, Helsinki, Finland, 09/8-Nov. 1998, pp. 1-19.

"*Proposed Wideband CDMA* (*W-CDMA*)", *Association of Radio Industries and Business* (*ARIB*), Japan, Dec. 1998 vol. 3 *Specifications of Air-Interface for 3G Mobil System,* 106 pages.

* cited by examiner

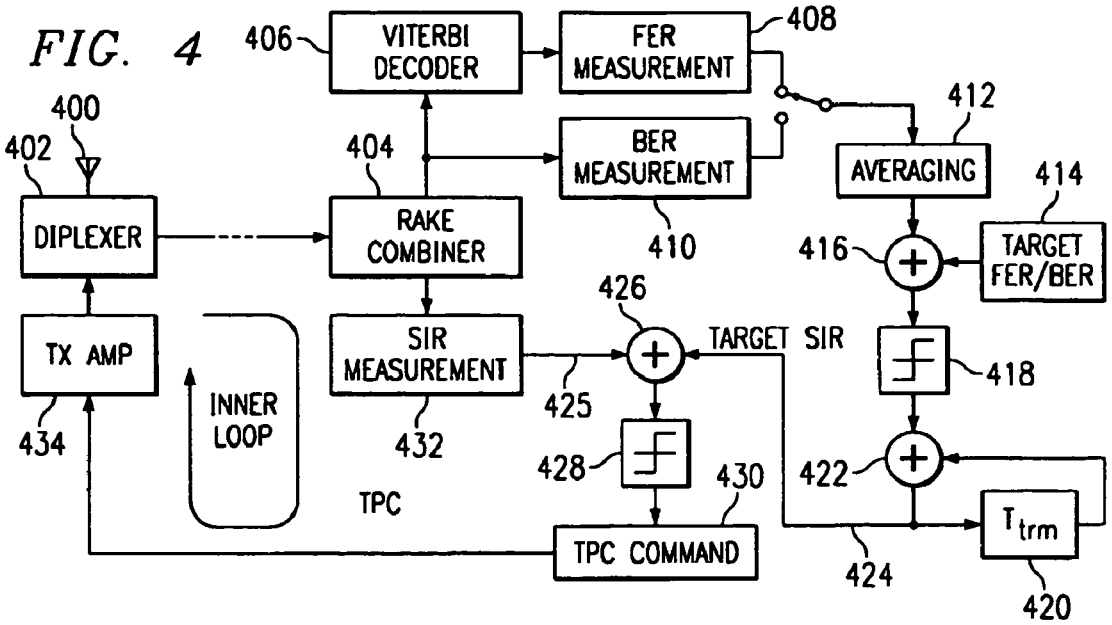
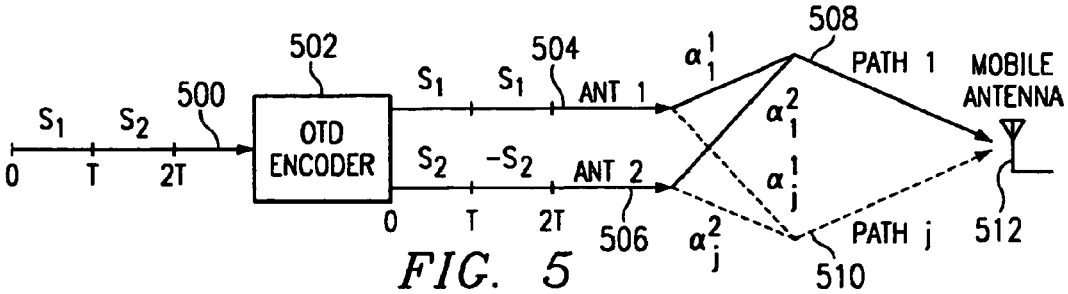
FIG. 5
(PRIOR ART)
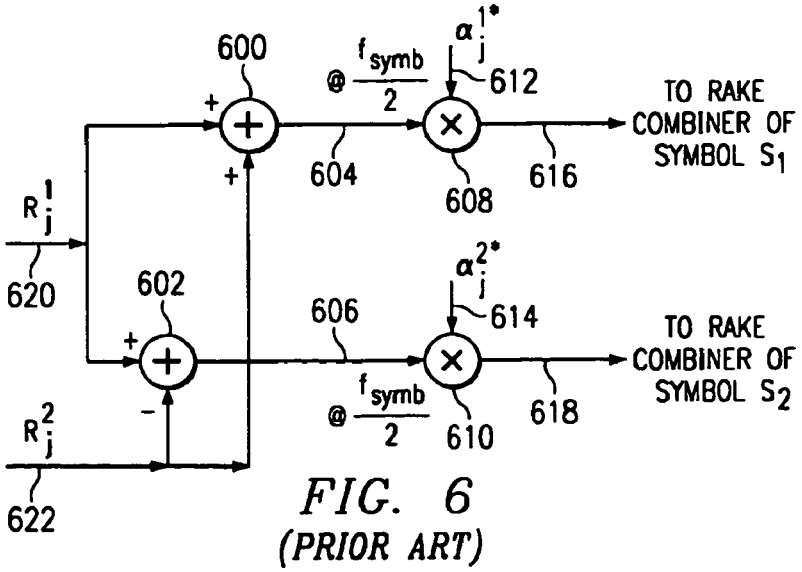
FIG. 6
(PRIOR ART)

POWER CONTROL WITH SPACE TIME TRANSMIT DIVERSITY

Matter enclosed in heavy brackets [ ] appears in the original patent but forms no part of this reissue specification; matter printed in italics indicates the additions made by reissue.

FIELD OF THE INVENTION

This invention relates to wideband code division multiple access (WCDMA) for a communication system and more particularly to power control with space time transmit diversity for WCDMA signals.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. Patent Application No. 60/082,671, filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into sixteen equal time slots of 0.625 milliseconds each. Each time slot is further subdivided into equal symbol times. At a data rate of 32 KSPS, for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_C$), therefore, is equal to the symbol time rate (T) divided by the number of chips in the symbol (N).

Previous studies have shown that multiple transmit antennas may improve reception by increasing transmit diversity for narrow band communication systems. In their paper New Detection Schemes for Transmit Diversity with no Channel Estimation, Tarokh et al. describe such a transmit diversity scheme for a TDMA system. The same concept is described in A Simple Transmitter Diversity Technique for Wireless Communications by Alamouti. Tarokh et al. and Alamouti, however, fail to teach such a transmit diversity scheme for a WCDMA communication system.

Other studies have investigated open loop transmit diversity schemes such as orthogonal transmit diversity (OTD) and time switched time diversity (TSTD) for WCDMA systems. Both OTD and TSTD systems have similar performance. Both use multiple transmit antennas to provide some diversity against fading, particularly at low Doppler rates and when there are insufficient paths for the rake receiver. Both OTD and TSTD systems, however, fail to exploit the extra path diversity that is possible for open loop systems. For example, the OTD encoder circuit of FIG. 5 receives symbols $S_1$ and $S_2$ on lead 500 and produces output signals on leads 504 and 506 for transmission by first and second antennas, respectively. These transmitted signals are received by a despreader input circuit (not shown). The despreader circuit sums received chip signals over a respective symbol time to produce first and second output signals $R_j^1$ and $R_j^2$ on leads 620 and 622 as in equations [1–2], respectively.

$$R_j^1 = \sum_{i=0}^{N-1} r_j(i+\tau_j) = \alpha_j^1 S_1 + \alpha_j^2 S_2 \quad [1]$$

$$R_j^2 = \sum_{i=N}^{2N-1} r_j(i+\tau_j) = \alpha_j^1 S_1 - \alpha_j^2 S_2 \quad [2]$$

The OTD phase correction circuit of FIG. 6 receives the output signals $R_j^1$ and $R_j^2$ corresponding to the $j^{th}$ of L multiple signal paths. The phase correction circuit produces soft outputs or signal estimates $\tilde{S}_1$ and $\tilde{S}_2$ for symbols $S_1$ and $S_2$ at leads 616 and 618 as shown in equations [3–4], respectively.

$$\tilde{S}_1 = \sum_{j=1}^{L} (R_j^1 + R_j^2)\alpha_j^{1*} = \sum_{j=1}^{L} 2|\alpha_j^1|^2 S_1 \quad [3]$$

$$\tilde{S}_2 = \sum_{j=1}^{L} (R_j^1 - R_j^2)\alpha_j^{2*} = \sum_{j=1}^{L} 2|\alpha_j^2|^2 S_2 \quad [4]$$

Equations [3–4] show that the OTD method provides a single channel estimate a for each path j. A similar analysis for the TSTD system yields the same result. The OTD and TSTD methods, therefore, are limited to a path diversity of L. This path diversity limitation fails to exploit the extra path diversity that is possible for open loop systems as will be explained in detail.

Previous methods of diversity have also failed to exploit closed-loop power control between a mobile communication system and a remote base station. Present WCDMA power control for a single transmit antenna is best understood with reference to the signal flow diagram of FIG. 7 of the prior art. Sequential time slots 700–702 of the forward link signal from a base station to a mobile system include respective pilot symbols 704–706. These pilot symbols, for example pilot symbols 704, are transmitted at time $t_m$ to the mobile system. The mobile system receives the pilot symbols and produces a transmit power control (TPC) symbol. This TPC symbol is transmitted in the reverse link to the remote base station. The remote base station adjusts transmit power for the next forward link time slot 701 at time $t_s$ in response to this TPC symbol. Thus, the power control system of FIG. 7 fails to exploit advantages of closed-loop power control with path diversity.

By way of comparison, the signal flow diagram of FIG. 8 illustrates proposed power control for a TSTD system of the prior art. The TSTD system alternately transmits forward link time slots 800–802 from antennas A1 and A2. Pilot symbols 806 of time slot 800 are transmitted from antenna A1 at time $t_{m1}$ followed by pilot symbols 807 of time slot 801 from antenna A2 at time $t_{m2}$. Circuit 814 sums these pilot symbols and produces TPC symbol 816. This TPC symbol is transmitted in reverse link to remote the base station. The remote base station adjusts transmit power of antenna A1 at time $t_s$ of time slot 802 in response this TPC symbol. The TSTD method, however, is limited to a path diversity of L. Moreover, two time slots are required for each transmit power adjustment from time $t_{m1}$ to time $t_s$. Thus, the TSTD system has an additional disadvantage of imprecise power control due to increased time between received power measurement and transmit power adjustment.

Hosur et al. previously taught a new method for frame synchronization with space time transmit diversity (STTD) having a path diversity of 2L in U.S. patent application Ser. No. 09/195,942, filed Nov. 19, 1998, and incorporated herein by reference. Therein, Hosur et al. taught advantages of this increased diversity for WCDMA systems. Hosur et al. did not teach or suggest how this improved diversity might be used to improve closed-loop power control for WCDMA systems.

SUMMARY OF THE INVENTION

The foregoing problems are resolved by a circuit designed with a measurement circuit. The measurement circuit is coupled to receive a first input signal from a first antenna of a transmitter and coupled to receive a second input signal from a second antenna of the transmitter. Each of the first and second signals is transmitted at a first time. The measurement circuit produces an output signal corresponding to a magnitude of the first and second signals. A control circuit is coupled to receive the output signal and a reference signal. The control circuit is arranged to produce a control signal at a second time in response to a comparison of the output signal and the reference signal.

The present invention improves closed-loop power control by providing at least 2L diversity over time and space. No additional transmit power or bandwidth is required. Power is balanced across multiple antennas.

BRIEF DESCRIPTION OF THE DRAWINGS

A more complete understanding of the invention may be gained by reading the subsequent detailed description with reference to the drawings wherein:

FIG. 4 is a block diagram of a receiver that may employ the phase correction circuit of FIG. 3;

FIG. 5 is a block diagram showing signal flow in an OTD encoder of the prior art;

FIG. 6 is a schematic diagram of a phase correction circuit of the prior art.

DETAILED DESCRIPTION OF THE PREFERRED EMBODIMENTS

Figure 1:
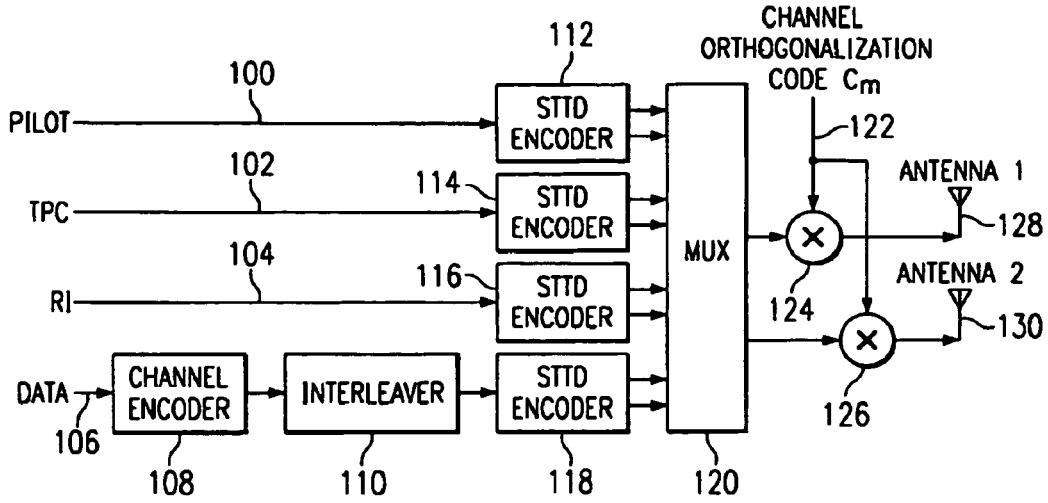
FIG. 1 is a simplified block diagram of a typical transmitter using Space Time Transit Diversity (STTD) of the present invention.

Referring to FIG. 1, there is a simplified block diagram of a typical transmitter using Space Time Transit Diversity (STTD) of the present invention. The transmitter circuit receives pilot symbols, TPC symbols, RI symbols and data symbols on leads 100, 102, 104 and 106, respectively. Each of the symbols is encoded by a respective STTD encoder as will be explained in detail. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Figure 2:
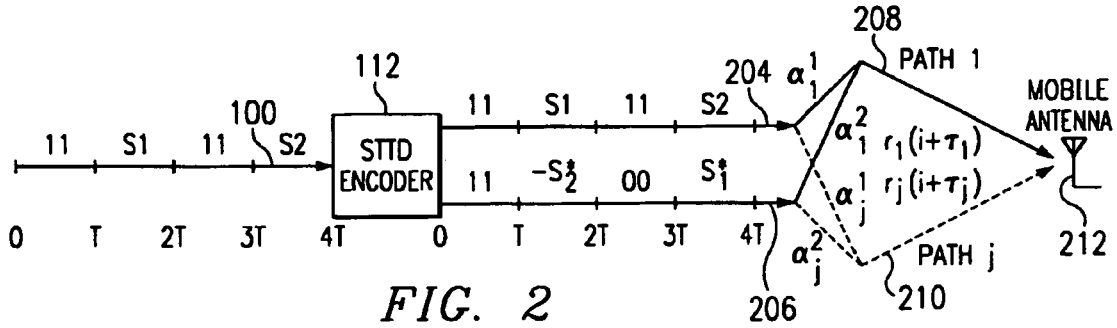
FIG. 2 is a block diagram showing signal flow in an STTD encoder of the present invention that may be used with the transmitter of FIG. 1.

Turning now to FIG. 2, there is a block diagram showing signal flow in an STTD encoder of the present invention that may be used with the transmitter of FIG. 1 for pilot symbol encoding. The pilot symbols are predetermined control signals that may be used for channel estimation and other functions as will be described in detail. Operation of the STTD encoder 112 will be explained with reference to TABLE 1. The STTD encoder receives pilot symbol 11 at symbol time T, pilot symbol $S_1$ at symbol time 2T, pilot symbol 11 at symbol time 3T and pilot symbol $S_2$ at symbol time 4T on lead 100 for each of sixteen time slots of a frame. For a first embodiment of the present invention having a data rate of preferably 32 KSPS, the STTD encoder produces a sequence of four pilot symbols for each of two antennas corresponding to leads 204 and 206, respectively, for each of the sixteen time slots of TABLE 1. The STTD encoder produces pilot symbols $B_1$, $S_1$, $B_2$ and $S_2$ at symbol times T–4T, respectively, for a first antenna at lead 204. The STTD encoder simultaneously produces pilot symbols $B_1$, $-S_2$*, $-B_2$ and $S_1$* at symbol times T–4T, respectively, at lead 206 for a second antenna. Each symbol includes two bits representing a real and imaginary component. An asterisk indicates a complex conjugate operation or sign change of the imaginary part of the symbol. Pilot symbol values for the first time slot for the first antenna at lead 204, therefore, are 11, 11, 11 and 11. Corresponding pilot symbols for the second antenna at lead 206 are 11, 01, 00 and 10.

The bit signals $r_j$ $(i+\tau_j)$ of these symbols are transmitted serially along respective paths 208 and 210. Each bit signal of a respective symbol is subsequently received at a remote mobile antenna 212 after a transmit time τ corresponding to the $j^{th}$ path. The signals propagate to a despreader input circuit (not shown) where they are summed over each respective symbol time to produce input signals $R_j^1$, $R_j^2$, $R_j^3$ and $R_j^4$ corresponding to the four pilot symbol time slots and the $j^{th}$ of L multiple signal paths as previously described.

TABLE 1

| | ANTENNA 1 | | | | ANTENNA 2 | | | |
|---|---|---|---|---|---|---|---|---|
| SLOT | $B_1$ | $S_1$ | $B_2$ | $S_2$ | $B_1$ | $-S_2^*$ | $-B_2$ | $S_1^*$ |
| 1 | 11 | 11 | 11 | 11 | 11 | 01 | 00 | 10 |
| 2 | 11 | 11 | 11 | 01 | 11 | 11 | 00 | 10 |
| 3 | 11 | 01 | 11 | 01 | 11 | 11 | 00 | 00 |
| 4 | 11 | 10 | 11 | 01 | 11 | 11 | 00 | 11 |
| 5 | 11 | 10 | 11 | 11 | 11 | 01 | 00 | 11 |
| 6 | 11 | 10 | 11 | 11 | 11 | 01 | 00 | 11 |
| 7 | 11 | 01 | 11 | 00 | 11 | 10 | 00 | 00 |
| 8 | 11 | 10 | 11 | 01 | 11 | 11 | 00 | 11 |
| 9 | 11 | 11 | 11 | 00 | 11 | 10 | 00 | 10 |
| 10 | 11 | 01 | 11 | 01 | 11 | 11 | 00 | 00 |
| 11 | 11 | 11 | 11 | 10 | 11 | 00 | 00 | 10 |
| 12 | 11 | 01 | 11 | 01 | 11 | 11 | 00 | 00 |
| 13 | 11 | 00 | 11 | 01 | 11 | 11 | 00 | 01 |
| 14 | 11 | 10 | 11 | 00 | 11 | 10 | 00 | 11 |
| 15 | 11 | 01 | 11 | 00 | 11 | 10 | 00 | 00 |
| 16 | 11 | 00 | 11 | 00 | 11 | 10 | 00 | 01 |

The input signals corresponding to the pilot symbols for each time slot are given in equations [5–8]. Noise terms are omitted for simplicity. Received signal $R_j^1$ is produced by pilot symbols ($B_1$, $B_1$) having a constant value (11,11) at symbol time T for all time slots. Thus, the received signal is equal to the sum of respective Rayleigh fading parameters corresponding to the first and second antennas. Likewise, received signal $R_j^3$ is produced by pilot symbols ($B_2$, $-B_2$) having a constant value (11,00) at symbol time 3T for all time slots. Channel estimates for the Rayleigh fading parameters corresponding to the first and second antennas, therefore, are readily obtained from input signals $R_j^1$ and $R_j^3$ as in equations [9] and [10].

$$R_j^1=\alpha_j^1+\alpha_j^2 \quad [5]$$

$$R_j^2=\alpha_j^1S_1-\alpha_j^2S_2^* \quad [6]$$

$$R_j^3=\alpha_j^1-\alpha_j^2 \quad [7]$$

$$R_j^4=\alpha_j^1S_1+\alpha_j^2S_1^* \quad [8]$$

$$\alpha_j^1=(R_j^1+R_j^3)/2 \quad [9]$$

$$\alpha_j^2=(R_j^1-R_j^3)/2 \quad [10]$$

Figure 3:
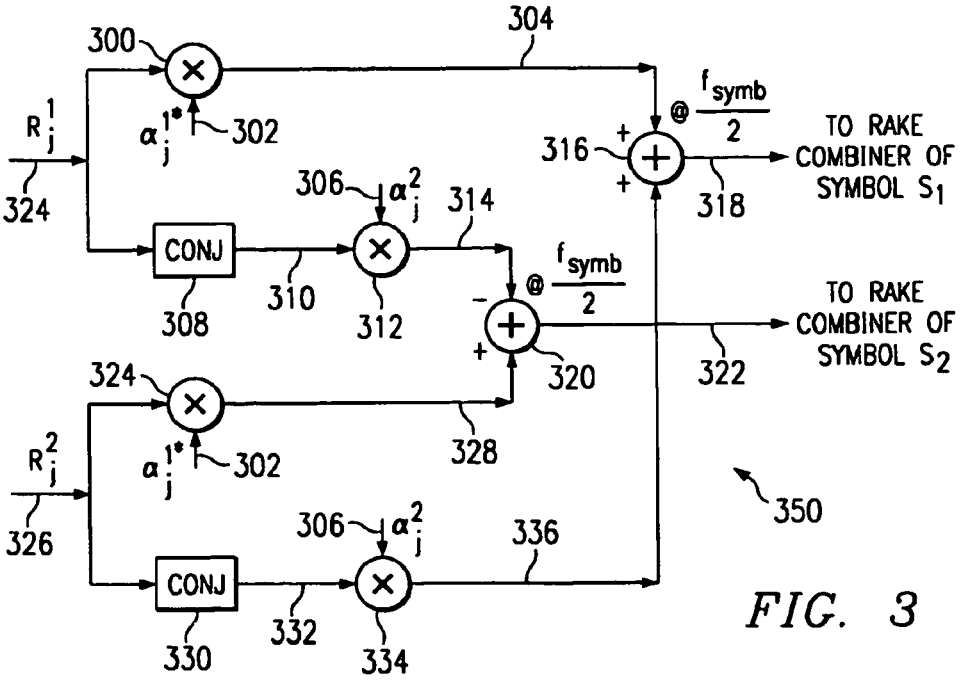
FIG. 3 is a schematic diagram of a phase correction circuit of the present invention that may be used with a receiver.
Figure 7:
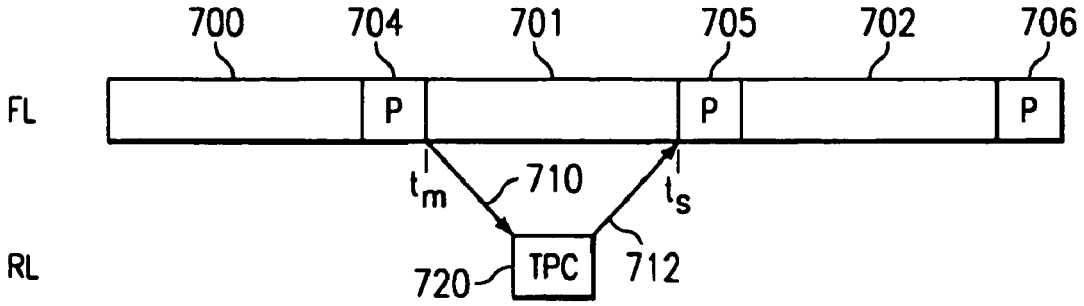
FIG. 7 (PRIOR ART)
FIG. 7 is a signal flow diagram of a power control loop of the prior art.

Referring now to FIG. 3, there is a schematic diagram of a phase correction circuit of the present invention that may be used with a remote mobile receiver. This phase correction circuit receives input signals $R_j^2$ and $R_j^4$ on leads 324 and 326 at symbol times 2T and 4T, respectively. Each input signal has a value determined by the transmitted pilot symbols as shown in equations [6] and [8], respectively. The phase correction circuit receives a complex conjugate of a channel estimate of a Rayleigh fading parameter $a_j^{1*}$ corresponding to the first antenna on lead 302 and a channel estimate of another Rayleigh fading parameter $a_j^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [11] and [12].

$$R_j^2\alpha_j^{1*}+R_j^{4*}\alpha_j^2=(|\alpha_j^1|^2+|\alpha_j^2|^2)S_1 \quad [11]$$

$$-R_j^{2*}\alpha_j^2+R_j^4\alpha_j^{1*}=(|\alpha_j^1|^2+|\alpha_j^2|^2)S_2 \quad [12]$$

These path-specific symbol estimates are then applied to a rake combiner circuit 404 (FIG. 4) to sum individual path-specific symbol estimates, thereby providing net soft symbols or pilot symbol signals as in equations [13] and [14].

$$\tilde{S}_1=\sum_{j=1}^{L} R_j^2\alpha_j^{1*}+R_j^{4*}\alpha_j^2 \quad [13]$$

$$\tilde{S}_2=\sum_{j=1}^{L} -R_j^{2*}\alpha_j^2+R_j^4\alpha_j^{1*} \quad [14]$$

These soft symbols or estimates provide a path diversity L and a transmit diversity 2. Thus, the total diversity of the STTD system is 2L. This increased diversity is highly advantageous in providing a reduced bit error rate.

Referring now to FIG. 4, there is a simplified diagram of a mobile communication system that may use the phase correction circuit (FIG. 3) with closed-loop power control of the present invention. The mobile communication system includes an antenna 400 for transmitting and receiving external signals. The diplexer 402 controls the transmit and receive function of the antenna. Multiple fingers of rake combiner circuit 404 combine received signals from multiple paths. Symbols from the rake combiner circuit 404, including pilot symbol signals of equations [13] and [14], are applied to a bit error rate (BER) circuit 410 and to a Viterbi decoder 406. Decoded symbols from the Viterbi decoder are applied to a frame error rate (FER) circuit 408. Averaging circuit 412 produces one of a FER and BER. This selected error rate is compared to a corresponding target error rate from reference circuit 414 by comparator circuit 416. The compared result is applied to bias circuit 420 via circuit 418 for generating a signal-to-interference ratio (SIR) reference signal on lead 424.

Pilot symbols from the rake combiner 404 are applied to the SIR measurement circuit 432. The SIR measurement circuit produces a received signal strength indicator (RSSI) estimate from an average of received pilot symbols. The SIR measurement circuit also produces an interference signal strength indicator (ISSI) estimate from an average of interference signals from base stations and other mobile systems over many time slots. The SIR measurement circuit produces an SIR estimate from a ratio of the RSSI signal to the ISSI signal. This SIR estimate is compared with a target SIR by circuit 426. This comparison result is applied to TPC command circuit 430 via circuit 428. The TPC command circuit 430 sets a TPC symbol control signal that is transmitted to a remote base station. This TPC symbol instructs the base station to either increase or decrease transmit power by preferably 1 dB for subsequent transmission.

Figure 9A:
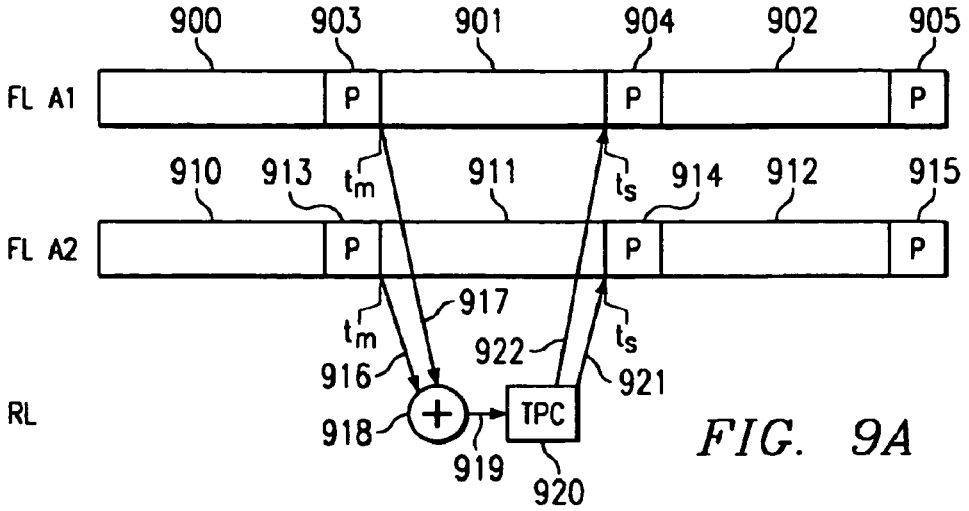
FIG. 9A is a signal flow diagram of a space time transmit diversity (STTD) power control loop of the present invention.

Referring now to FIG. 9A, there is a signal flow diagram of an embodiment of closed-loop power control for a STTD system of the present invention. The STTD system transmits forward link time slots 900–902 from antenna A1 in parallel with forward link time slots 910–912 from antenna A2. Pilot symbols 903 of time slot 900 from antenna A1 and pilot symbols 913 of time slot 910 from antenna A2 are transmitted at time $t_m$. Circuit 918, included in SIR measurement circuit 432 (FIG. 4), sums these pilot symbols. The sum is compared to a target SIR on lead 424. A result of the comparison is applied to TPC command circuit 430 via circuit 428. The TPC command circuit produces TPC symbol 920 (FIG. 9A) for transmission to the remote base station in the reverse link. The remote base station adjusts transmit power of antenna A1 for time slot 901 and transmit power of antenna A2 for time slot 911 at time $t_s$ in response this TPC symbol. This method of closed-loop transmit power control is highly advantageous in regulating transmit power with minimum variance. Channel estimates and corresponding pilot symbol signal estimates are greatly improved by STTD. Accuracy of subsequent measurement of these received pilot symbol signal magnitudes is greatly improved. Transmit power variance is minimized for both antennas A1 and A2 by transmit power adjustment in a time slot immediately following the measured pilot symbol signal time slot.

Figure 9B:
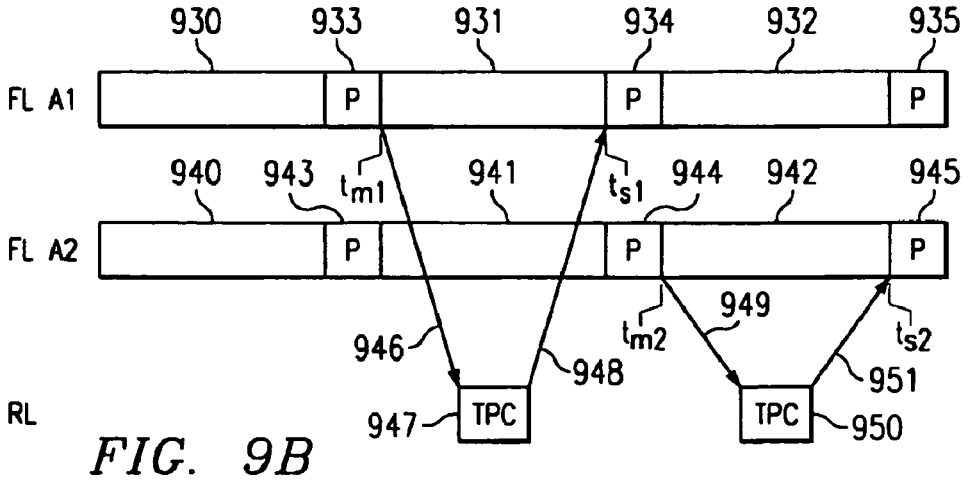
FIG. 9B is a signal flow diagram of another embodiment of a STTD power control loop of the present invention.

Turning now to FIG. 9B, there is a signal flow diagram of another embodiment of closed-loop power control for a STTD system of the present invention. The STTD system transmits forward link time slots 930–932 from antenna A1 in parallel with forward link time slots 940–942 from antenna A2. Pilot symbols 933 of time slot 930 from antenna A1 are transmitted at time $t_{m1}$. The SIR measurement circuit 432 (FIG. 4) measures these pilot symbols and compares them with a target SIR on lead 424. The TPC command circuit 430 produces TPC symbol 947 (FIG. 9B) for transmission to the remote base station in the reverse link. The remote base station adjusts transmit power of antenna A1 for time slot 931 at time $t_{s1}$ in response this TPC symbol. Pilot symbols 944 of time slot 941 from antenna A2 are transmitted at time $t_{m2}$. The SIR measurement circuit 432 (FIG. 4) measures these pilot symbols and produces TPC symbol 950 (FIG. 9B) for transmission to the remote base station in the reverse link. The remote base station adjusts transmit power of antenna A2 for time slot 942 at time $t_{s2}$ in response this TPC symbol. This embodiment of the present invention, therefore, provides a further advantage of independent power control of each transmit antenna. Transmit power variance is minimized by adjusting transmit power for each antenna in a time slot immediately following the measured pilot symbol signal time slot.

Figure 9C:
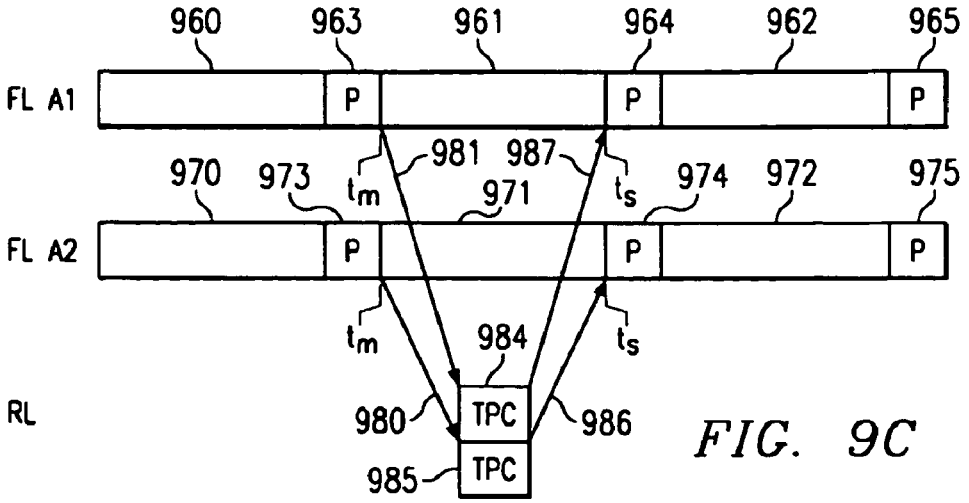
FIG. 9C is a signal flow diagram of yet another embodiment of a STTD power control loop of the present invention.

The signal flow diagram of FIG. 9C illustrates yet another embodiment of closed-loop power control for a STTD system of the present invention. The STTD system transmits forward link time slots 960–962 from antenna A1 in parallel with forward link time slots 970–972 from antenna A2. Pilot symbols 963 of time slot 960 from antenna A1 and pilot symbols 973 of time slot 970 from antenna A2 are transmitted at time $t_m$. The SIR measurement circuit 432 (FIG. 4) measures each of these pilot symbols and compares them to a target SIR on lead 424. A result of the comparison is applied to TPC command circuit 430 via circuit 428. The TPC command circuit produces TPC symbols 984 and 985 (FIG. 9C) corresponding to antennas A1 and A2, respectively. Both TPC symbol signals are transmitted to the remote base station in the same time slot of the reverse link. The remote base station independently adjusts transmit power of antennas A1 and A2 at time $t_s$ in response to TPC symbols 984 and 985, respectively. This method of closed-loop transmit power control is highly advantageous in regulating transmit power with minimum variance. Transmit power of each antenna A1 and A2 is independently controlled. Transmit power variance is minimized for both antennas2 by transmit power adjustment in a time slot immediately following the measured pilot symbol signal time slot.

Figure 10A:
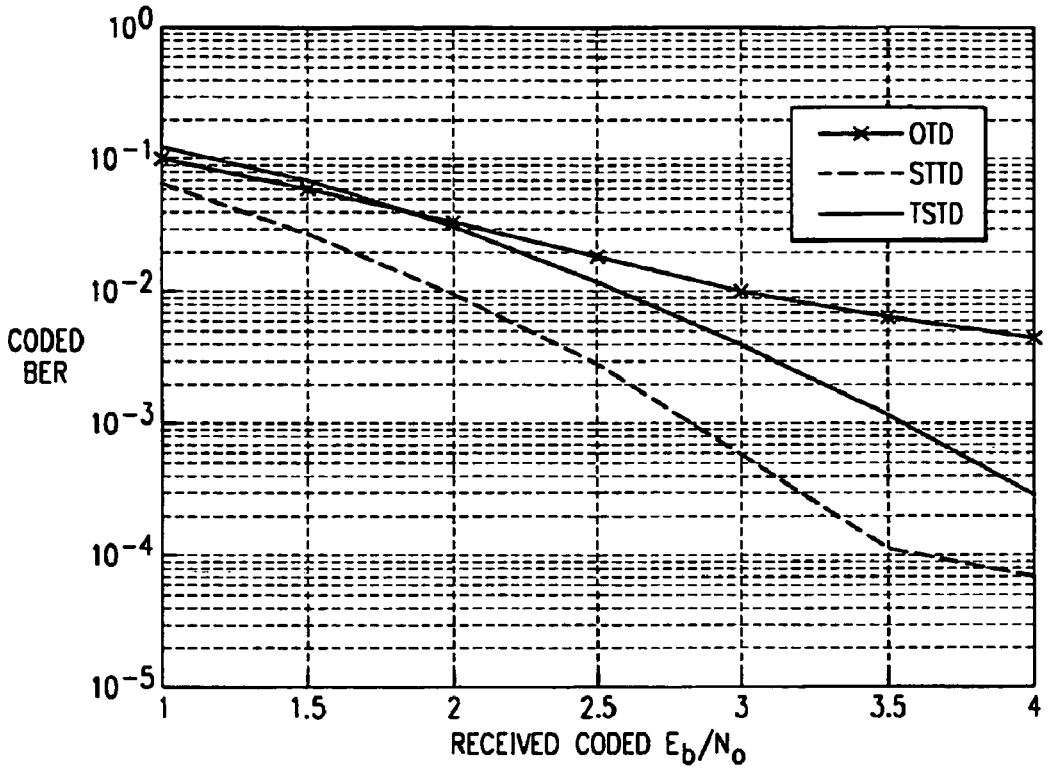
FIG. 10A is a simulation of weighted multi-slot average (WMSA) channel estimation for STTD and TSTD for 5 Hz Doppler.
Figure 10B:
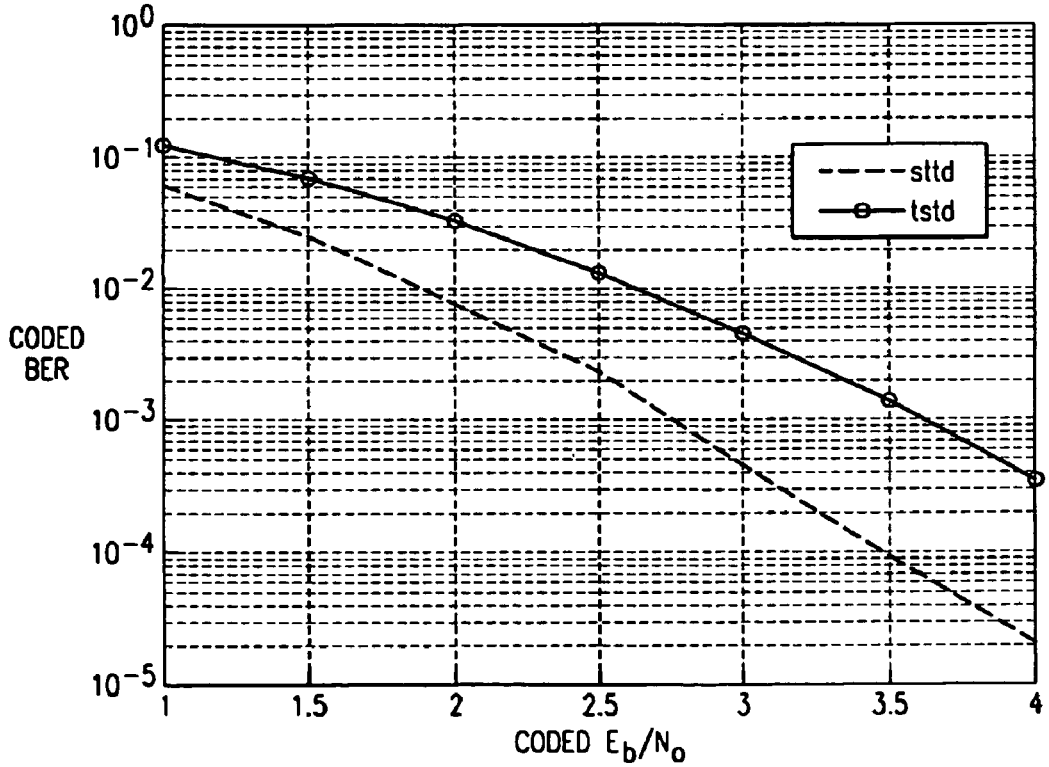
FIG. 10B is a simulation of power control for STTD and TSTD for 5 Hz Doppler.

Referring now to FIG. 10A, advantages of the present invention will be explained in detail with reference to the simulation of weighted multi-slot average (WMSA) channel estimation for STTD and TSTD for 5 Hz Doppler. The simulation curves show a coded bit error rate (BER) for a range of ratios of energy per bit (Eb) over noise (N0). The 5 Hz Doppler corresponds to mobile station movement with respect to a base station at walking speed. For a coded BER of preferably $10^{-3}$, STTD shows approximately 0.75 dB improvement with respect to TSTD. Both show significant improvement over OTD. The simulation curves of FIG. 10B compare power control for STTD and TSTD for 5 Hz Doppler. For example, STTD shows approximately 0.9 dB improvement over TSTD for a coded BER of preferably $10^{-3}$.

Figure 11A:
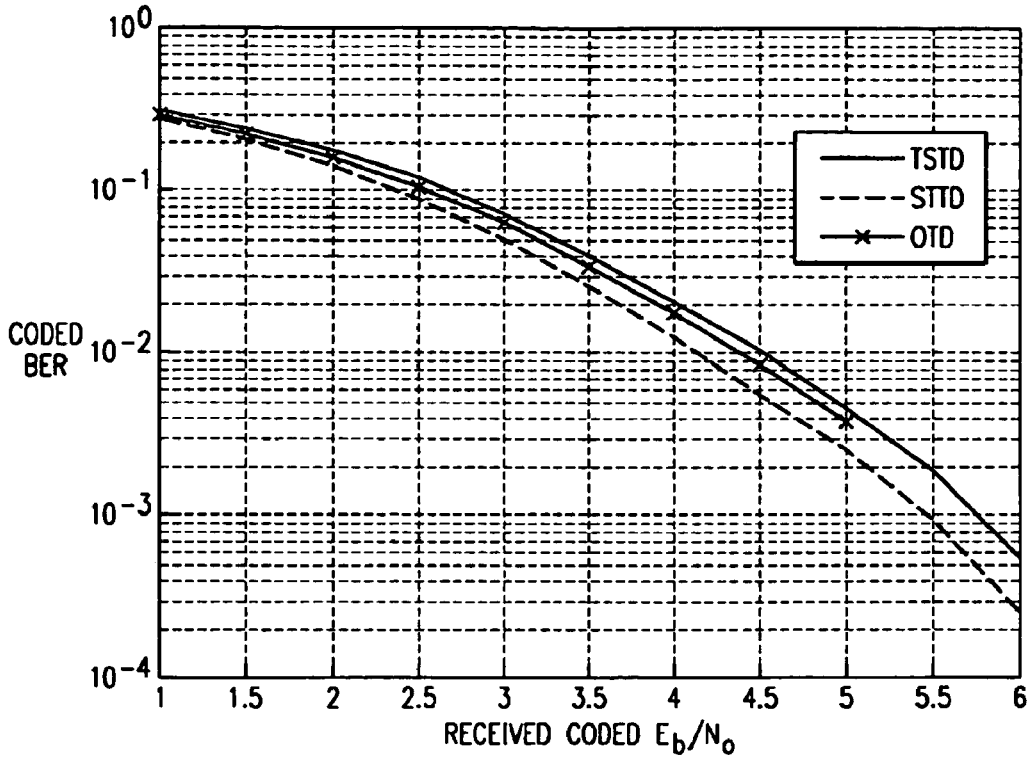
FIG. 11A is a simulation of weighted multi-slot average (WMSA) channel estimation for STTD and TSTD for 200 Hz Doppler.
Figure 11B:
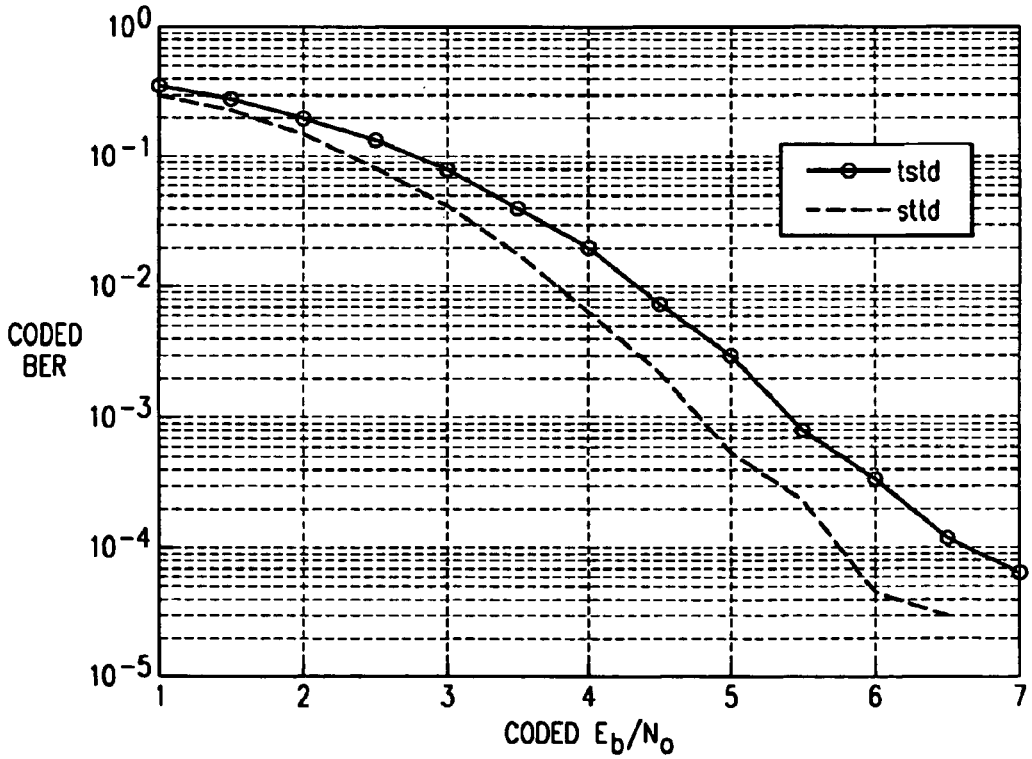
FIG. 11B is a simulation of power control for STTD and TSTD for 200 Hz Doppler.

Simulation curves of FIG. 11A show a coded bit error rate (BER) for a range of Eb/N0 for WMSA channel estimation at 200 Hz Doppler, corresponding to mobile station movement with respect to a base station at a vehicular speed of 120 kmph (80 mph). The STTD system shows approximately 0.25 dB improvement with respect to OTD at a coded BER of preferably $10^{-3}$. A similar advantage over TSTD is likely in view of the similarity of TSTD and OTD curves. Likewise, for a preferable coded BER of $10^{-3}$, the curves of FIG. 11B show a 0.75 dB improvement in power control for STTD over TSTD for 200 Hz Doppler. The STTD system, therefore, provides significantly improved BER over OTD and TSTD systems of the prior art.

Although the invention has been described in detail with reference to its preferred embodiment, it is to be understood that this description is by way of example only and is not to be construed in a limiting sense. For example, advantages of the present invention may be achieved by a digital signal processing circuit as will be appreciated by those of ordinary skill in the art having access to the instant specification. Furthermore, the advantages of STTD accuracy and independent transmit antenna power control as described in FIG. 9C may be achieved with a single TPC symbol signal. A QPSK TPC symbol signal includes four states, including two states for each of the real and imaginary components. The real components, for example, may correspond to antenna A1 and the imaginary components may correspond to antenna A2. Thus, a state of the real or imaginary component of a single TPC symbol may be used to independently adjust transmit power of antenna A1 or antenna A2, respectively.

Figure 8:
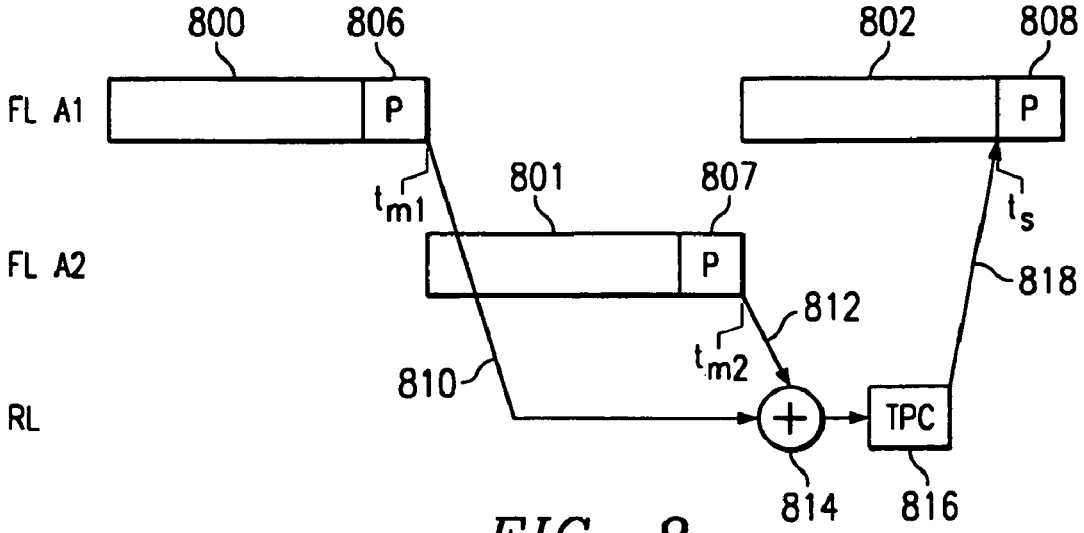
FIG. 8 (PRIOR ART)
FIG. 8 is a signal flow diagram of a time switched time diversity (TSTD) power control loop of the prior art.

Moreover, advantages of the present invention may be extended to four transmit antennas by including the previously described STTD symbol pattern (FIG. 2) as an overlay of the OTD (FIG. 5) or TSTD (FIG. 8) symbol patterns. The STTD overlay pattern for OTD with four antennas is given by equation [15].

$$\begin{vmatrix} Ant_1 \\ Ant_2 \\ Ant_3 \\ Ant_4 \end{vmatrix} = \begin{vmatrix} a & b & a & b \\ -b^* & a^* & -b^* & a^* \\ c & d & -c & -d \\ -d^* & c^* & d^* & -c^* \end{vmatrix} \quad [15]$$

This STTD overlay pattern for OTD substitutes the STTD symbol pattern of FIG. 2 for each OTD symbol of FIG. 5. For example, the four upper-left matrix elements $\lfloor a\ b\ -b^*\ a^* \rfloor$ of equation [15] correspond to STTD symbols $\lfloor S_1\ S_2\ -S_2^*\ S_1^* \rfloor$ of FIG. 2. These four elements of equation [15] and the four top-right duplicate matrix elements correspond to elements $[S_1\ S_1]$ on lead 504 (FIG. 5). Likewise, the four bottom-left matrix elements and the four bottom-right matrix elements of equation [15] correspond to elements $[S_2\ -S_2]$ on lead 506 (FIG. 5). An STTD overlay pattern for TSTD is given by equation [16] where $\phi$ corresponds to null elements when alternate antennas are transmitting.

$$\begin{vmatrix} Ant_1 \\ Ant_2 \\ Ant_3 \\ Ant_4 \end{vmatrix} = \begin{vmatrix} a & b & \phi & \phi \\ -b^* & a^* & \phi & \phi \\ \phi & \phi & c & d \\ \phi & \phi & -d^* & c^* \end{vmatrix} \quad [16]$$

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A circuit, comprising:

a measurement circuit coupled to receive a first wideband code division multiple access signal, comprising at least one pilot, from a first antenna of a remote transmitter and coupled to receive a second wideband code division multiple access signal, comprising at least one pilot, from a second antenna of the remote transmitter, each of the first and second wideband code division multiple access signals being transmitted at a first time, the measurement circuit producing a first output signal corresponding to a magnitude of the first wideband code division multiple access signal and a second output signal corresponding to a magnitude of the second wideband code division multiple access signal; and a control circuit coupled to receive the output signal and a reference signal, the control circuit arranged to produce a first transmit power control signal and a second transmit power control signal at a second time in response to a comparison of the output signal and the reference signal, each of the first and second transmit power control signals set to control transmit power of respective said first and second antennas.

2. A circuit as in claim 1, further comprising an estimate circuit coupled to receive at least a first predetermined signal and a second predetermined signal from the remote transmitter, each of the first and second predetermined signals having respective predetermined values, the estimate circuit producing at least one of the first estimate signal and the second estimate signal in response to the first and second predetermined signals.

3. A circuit as in claim 2, wherein each of the first and second predetermined signals are pilot symbols.

4. A circuit as in claim 3, wherein the measurement circuit, the control circuit and the estimate circuit are formed on a single integrated circuit.

5. A circuit as in claim 3, wherein each of the first and second estimate signals is a Rayleigh fading parameter estimate.

6. A circuit as in claim 3, wherein a total path diversity of each of the first and second symbol estimates is at least twice a number of transmitting antennas.

7. A circuit as in claim 1, wherein the measurement circuit is further coupled to receive a third input signal from a third antenna of the remote transmitter and coupled to receive a fourth input signal from a fourth antenna of the remote transmitter, each of the third and fourth input signals being transmitted at the first time, and wherein the output signal further corresponds to at least one of the third and fourth input signals.

8. A circuit as in claim 7, wherein each of the input signals comprise at least one pilot symbol.

9. A circuit as in claim 7, wherein each of the input signals is a wideband code division multiple access signal.

10. A circuit as in claim 7, wherein the output signal corresponds to a sum of magnitudes of the input signals.

11. A circuit as in claim 7, wherein the control signal comprises at least one transmit power control signal.

12. A circuit, comprising:

a measurement circuit coupled to receive a first input signal from a first antenna of a transmitter at a first time and coupled to receive a second input signal from a second antenna of the transmitter at a third time, the measurement circuit producing a first output signal corresponding to a magnitude of the first input signal and producing a second output signal corresponding to a magnitude of the second input signal; and a control circuit coupled to receive the first and second output signals and a reference signal, the control circuit arranged to produce a first control signal at a second time after the first time in response to a comparison of the first output signal and the reference signal, the control circuit arranged to produce a second control signal at a fourth time after the third time in response to a comparison of the second output signal and the reference signal.

13. A circuit as in claim 12, wherein each of the first and second input signals comprise at least one pilot symbol.

14. A circuit as in claim 12, wherein each of the first and second control signals comprise at least one transmit power control signal.

15. A circuit as in claim 12, wherein each of the first and second input signals is a wideband code division multiple access signal.

16. A circuit as in claim 12, further comprising an estimate circuit coupled to receive at least a first predetermined signal and a second predetermined signal from the transmitter source, each of the first and second predetermined signals having respective predetermined values, the estimate circuit producing the first estimate signal and the second estimate signal in response to the first and second predetermined signals.

17. A method of processing signals for a communication system, comprising the steps of:

receiving at least one control signal, comprising at least one transmit power control signal, transmitted from an external source at a first time;

producing a transmit power level corresponding to at least one of a plurality of antennas in response to the control signal; and transmitting a plurality of signals to the external source at a respective said transmit power level at a second time from a respective said plurality of antennas, wherein the at least one transmit power control signal includes a plurality of transmit power control signals, and wherein the respective said transmit power level for each of said plurality of antennas is set by a respective transmit power control signal of the plurality of transmit power control signal.

18. A method of processing signals as in claim 17, wherein the respective said transmit power level has a same transmit power adjustment for each of said plurality of antennas in response to one transmit power control signal.

19. A method of processing signals, comprising the steps of:

selecting a diversity pattern having plural elements corresponding to plural signal sources and plural times;

selecting a symbol pattern having a plurality of symbols corresponding to plural signal sources and plural times;

producing an overlay of each element of the diversity pattern with the symbol pattern.

20. A method as in claim 19, wherein each element of the diversity pattern is one of a true and a complement of another element in the diversity pattern.

21. A method as in claim 19, wherein each symbol of the symbol pattern is at least one of a true, a complement and a conjugate of another symbol in the symbol pattern.

22. A method as in claim 19, further comprising the steps of:

transmitting a first symbol of the symbol pattern corresponding to a first element of the diversity pattern from a first antenna at a first time;

transmitting a second symbol of the symbol pattern corresponding to the first element of the diversity pattern from a second antenna at the first time;

transmitting a fifth symbol of the symbol pattern corresponding to a second element of the diversity pattern from a third antenna at the first time; and transmitting a sixth symbol of the symbol pattern corresponding to the second element of the diversity pattern from a fourth antenna at the first time.

23. A method as in claim 22, further comprising the steps of:

transmitting a third symbol of the symbol pattern corresponding to the first element of the diversity pattern from the first antenna at a second time;

transmitting a fourth symbol of the symbol pattern corresponding to the first element of the diversity pattern from the second antenna at the second time;

transmitting a seventh symbol of the symbol pattern corresponding to the second element of the diversity pattern from the third antenna at the second time; and transmitting an eighth symbol of the symbol pattern corresponding to the second element of the diversity pattern from the fourth antenna at the second time.

24. A method as in claim 19, further comprising the steps of:

transmitting a first symbol of the symbol pattern corresponding to a first element of the diversity pattern from a first antenna at a first time;

transmitting a second symbol of the symbol pattern corresponding to the first element of the diversity pattern from a second antenna at the first time;

transmitting a fifth symbol of the symbol pattern corresponding to a second element of the diversity pattern from a third antenna at a third time; and transmitting a sixth symbol of the symbol pattern corresponding to the second element of the diversity pattern from a fourth antenna at the third time.

25. A method as in claim 24, further comprising the steps of:

transmitting a third symbol of the symbol pattern corresponding to the first element of the diversity pattern from the first antenna at a second time;

transmitting a fourth symbol of the symbol pattern corresponding to the first element of the diversity pattern from the second antenna at the second time;

transmitting a seventh symbol of the symbol pattern corresponding to the second element of the diversity pattern from the third antenna at a fourth time; and transmitting an eighth symbol of the symbol pattern corresponding to the second element of the diversity pattern from the fourth antenna at the fourth time.

26. A method as in claim 24, further comprising the steps of:

not transmitting from the third and the fourth antennas during a part of the first time; and not transmitting from the first and the second antennas during a part of the third time.

27. A method of processing signals, comprising the steps of:

receiving an overlay pattern of transmitted symbols from plural signal sources at plural times;

decoding the overlay pattern according to a diversity pattern having plural elements corresponding to plural signal sources and plural times; and decoding the overlay pattern according to a symbol pattern having a plurality of symbols corresponding to plural signal sources and plural times, the symbol pattern corresponding to each of plural elements of the diversity pattern.

28. A method as in claim 27, wherein each element of the diversity pattern is one of a true and a complement of another element in the diversity pattern.

29. A method as in claim 27, wherein each symbol of the symbol pattern is at least one of a true, a complement and a conjugate of another symbol in the symbol pattern.

30. A method as in claim 27, further comprising the steps of:

receiving a first symbol of the symbol pattern corresponding to a first element of the diversity pattern from a first antenna at a first time;

receiving a second symbol of the symbol pattern corresponding to the first element of the diversity pattern from a second antenna at the first time;

receiving a fifth symbol of the symbol pattern corresponding to a second element of the diversity pattern from a third antenna at the first time; and receiving a sixth symbol of the symbol pattern corresponding to the second element of the diversity pattern from a fourth antenna at the first time.

31. A method as in claim 30, further comprising the step of decoding the first, second, fifth and sixth symbols.

32. A method as in claim 30, further comprising the steps of:

receiving a third symbol of the symbol pattern corresponding to the first element of the diversity pattern from the first antenna at a second time;

receiving a fourth symbol of the symbol pattern corresponding to the first element of the diversity pattern from the second antenna at the second time;

receiving a seventh symbol of the symbol pattern corresponding to the second element of the diversity pattern from the third antenna at the second time; and receiving an eighth symbol of the symbol pattern corresponding to the second element of the diversity pattern from the fourth antenna at the second time.

33. A method as in claim 27, further comprising the steps of:

receiving a first symbol of the symbol pattern corresponding to a first element of the diversity pattern from a first antenna at a first time;

receiving a second symbol of the symbol pattern corresponding to the first element of the diversity pattern from a second antenna at the first time;

receiving a fifth symbol of the symbol pattern corresponding to a second element of the diversity pattern from a third antenna at a third time; and receiving a sixth symbol of the symbol pattern corresponding to the second element of the diversity pattern from a fourth antenna at the third time.

34. A method as in claim 33, further comprising the steps of:

not decoding a symbol from the third and the fourth antennas during the first time; and not decoding from the first and the second antennas during the third time.

35. A method as in claim 33, further comprising the steps of:

receiving a third symbol of the symbol pattern corresponding to the first element of the diversity pattern from the first antenna at a second time;

receiving a fourth symbol of the symbol pattern corresponding to the first element of the diversity pattern from the second antenna at the second time;

receiving a seventh symbol of the symbol pattern corresponding to the second element of the diversity pattern from the third antenna at a fourth time; and receiving an eighth symbol of the symbol pattern corresponding to the second element of the diversity pattern from the fourth antenna at the fourth time.

*36. A method of processing signals for a communication system, comprising the steps of:*

*receiving a power control signal transmitted from an external source at a first time;*

*producing a transmit power level at a first antenna and a second antenna in response to the power control signal; and*

*transmitting a plurality of signals to the external source from the first and second antennas at the respective transmit power levels at a second time.*

*37. A method as in claim 36, wherein the plurality of signals comprises at least one pilot symbol.*

*38. A method as in claim 36, wherein the plurality of signals comprises wideband code division multiple access signals.*

* * * * *